(12) United States Patent
Jones (10) Patent No.: US 12,336,501 B2
(45) Date of Patent: Jun. 24, 2025

(54) SOLAR-POWERED GPS SIM CARD DEVICE FOR TRACKING AND MONITORING ANIMALS AND ASSETS

(71) Applicant: Andy Doyle Jones, Edmond, OK (US)

(72) Inventor: Andy Doyle Jones, Edmond, OK (US)

(*) Notice: Subject to any disclaimer, the term of this patent is extended or adjusted under 35 U.S.C. 154(b) by 377 days.

(21) Appl. No.: 17/809,880

(22) Filed: Jun. 29, 2022

(65) Prior Publication Data

US 2022/0400651 A1 Dec. 22, 2022

Related U.S. Application Data (63) Continuation-in-part of application No. 17/196,993, filed on Mar. 9, 2021, now Pat. No. 11,503,802, which is a continuation-in-part of application No. 16/815,280, filed on Mar. 11, 2020, now Pat. No. 10,939,665, which is a continuation-in-part of application No. 16/727,736, filed on Dec. 26, 2019, now Pat. No. 10,945,097, application No. 17/809,880 is a continuation-in-part of application No. 17/196,987, filed on Mar. 9, 2021, now abandoned, which is a continuation-in-part of application No. 16/727,736, filed on Dec. 26, 2019, now Pat. No. 10,945,097.

(Continued)

(51) Int. Cl.
*A01K 11/00* (2006.01)
*A01K 29/00* (2006.01)
*H04W 4/029* (2018.01)

(52) U.S. Cl.
CPC .......... *A01K 11/008* (2013.01); *A01K 29/005* (2013.01); *H04W 4/029* (2018.02)

(58) Field of Classification Search
CPC .... A01K 11/008; A01K 11/00; A01K 11/001; A01K 11/002; A01K 11/004; A01K 11/003; A01K 29/005; A01K 29/00; A01K 11/006; H04W 4/029; H04W 12/12; H04W 12/104; H04W 12/10; H04W 12/126; H04W 12/42; H04W 12/43; H04W 12/47; H04W 12/48; H04W 12/50; H04W 12/60; H04W 12/63; H04W 12/64; H04W 12/77; H04W 12/79; H04W 84/06; H04W 4/38; H04W 4/80; H04W 8/08; H04W 12/009; H04W 4/50; H04W 4/02; H04W 4/60
See application file for complete search history.

(56) References Cited

U.S. PATENT DOCUMENTS 9,198,400 B2 * 12/2015 O'Hare ................ A01K 29/005
9,861,080 B1 * 1/2018 Hathway et al. .... A01K 27/009
(Continued)

FOREIGN PATENT DOCUMENTS

CN 204032048 U 12/2014
CN 204860518 U 12/2015
(Continued)

OTHER PUBLICATIONS (CN 209518082 U) >>> An Electronic Ear Tag (see title) (Year: 2019).*

(Continued)

*Primary Examiner* — Meless N Zewdu (57) ABSTRACT

Disclosed is a solar-powered GPS Sim card tracking and monitoring features device for animals and assets.

1 Claim, 10 Drawing Sheets

Related U.S. Application Data

(60) Provisional application No. 63/216,122, filed on Jun. 29, 2021, provisional application No. 62/896,985, filed on Sep. 6, 2019.

(56) References Cited

U.S. PATENT DOCUMENTS

| | | |
|---|---|---|
| 9,936,676 B1 | 4/2018 | Ulmer |
| 10,242,547 B1 * | 3/2019 | Struhsker et al. ..... G08B 21/18 |
| 10,682,062 B2 | 6/2020 | Brandao |
| 10,939,665 B1 * | 3/2021 | Jones ................... A01K 11/004 |
| 10,945,097 B1 * | 3/2021 | Jones ................... H04W 4/029 |
| 2005/0145187 A1 | 6/2005 | Gray |
| 2012/0201277 A1 * | 8/2012 | Tanner et al. ................. 375/141 |
| 2013/0340305 A1 | 12/2013 | Mobley |
| 2016/0277688 A1 * | 9/2016 | Gaskamp et al. ..... H04N 5/332 |
| 2016/0338000 A1 | 11/2016 | Halla |
| 2017/0042119 A1 * | 2/2017 | Garrity ............... A01K 11/008 |
| 2020/0323170 A1 | 10/2020 | Garigan |

FOREIGN PATENT DOCUMENTS

| | | | | |
|---|---|---|---|---|
| WO | WO 2019006245 A1 * | 1/2019 | ............ | A01K 29/00 |
| WO | WO 2019161397 A1 * | 8/2019 | ............... | A61B 5/01 |

OTHER PUBLICATIONS (CN 108377931 A) >>> A Multifunctional Animal Ear Tag for Rapid Hierarchical Positioning (see title) (Year: 2018).*

* cited by examiner

SOLAR-POWERED GPS SIM CARD DEVICE FOR TRACKING AND MONITORING ANIMALS AND ASSETS

The current application claims a priority to the U.S. provisional patent application Ser. No. 63/216,122 filed on Jun. 29, 2021.

The current application is also a continuation-in-part (CIP) application of a U.S. non-provisional application Ser. No. 17/196,993 filed on Mar. 9, 2021. The U.S. non-provisional application Ser. No. 17/196,993 is a CIP application of a U.S. non-provisional application Ser. No. 16/815,280 filed on Mar. 11, 2020. The U.S. non-provisional application Ser. No. 16/815,280 claims a priority to the U.S. non-provisional application Ser. No. 16/727,736 filed on Dec. 26, 2019 and also claims a priority to the U.S. Provisional Patent application Ser. No. 62/896,985 filed on Sep. 6, 2019.

The current application is also a CIP application of a U.S. non-provisional application Ser. No. 17/196,987 filed on Mar. 9, 2021. The U.S. non-provisional application Ser. No. 17/196,987 filed on Mar. 9, 2021 is a CIP application of a U.S. non-provisional application Ser. No. 16/727,736 filed on Dec. 26, 2019. The U.S. non-provisional application Ser. No. 16/727,736 claims a priority to the U.S. Provisional Patent application Ser. No. 62/896,985 filed on Sep. 6, 2019.

FIELD OF THE INVENTION

The present invention relates to global navigation satellite system (GNSS) devices. The present invention pertains primarily to the field of animal husbandry and to the electronic tagging and tracking of an animal or object. The present invention consists of an electronic ear tag for monitoring a wide range of features of the animal to which the device is attached to via a satellite positioning system and relays the data over one or more wireless network and is thereby transmitted over the internet to servers for processing and display.

More specifically, the present invention is a highly-advanced-to-basic satellite tracking and monitoring device, which includes optional low or high indoor/outdoor light using solar tech/and or advanced charging chips/New tech for continual power linked to the advanced or basic battery on device, element/crush proof housing/mold encapsulates device, utilizing multi communication options via direct from device to satellite, direct from base station to satellite, Sim Gateway, Sim on device, Wi-Fi and RFID. The present invention also connects with easy-to-use app/interface/software for basic-to-highly-advanced features for any/all personal computer devices such as, but not limited to, cell phone, personal computer, laptop, tablet, or a television.

BACKGROUND OF THE INVENTION

An electronic ear tag allows an individual to track an animal. Further, the electronic ear tag is an ultra-low power, and lightweight tag that runs only when needed. The electronic ear tag includes a substrate, a microcontroller, a rechargeable battery, a wireless communication module, a GNSS module, and a solar panel. The substrate is a circuit board used to support the electrical components of the present invention. The micro controller is used to manage and control the electronic components of the electronic ear tag. The rechargeable battery is the main power source of the electronic ear tag to communicate with a central network. The GNSS module allows the electronic ear tag to communicate with a GNSS satellite. The solar panel is responsible for converting solar energy into electrical energy used to charge the rechargeable battery.

The present invention relates to a wireless network animal electronic ear tag, which facilitates the placement of a GNSS positioning tag on the body of an animal. The specific technical scheme is that the wireless network animal electronic ear tag comprises a tag body, a GNSS positioning chip, a rechargeable battery, and a plastic casing, wherein the plastic casing is arranged on the upper surface and the lower surface of the GNSS positioning chip and the GNSS positioning chip is fixed in the tag body. Since the tag body protects the GNSS positioning chip, the GNSS positioning chip is safe from being damaged by external force, sunlight, water, etc. There is a theft-prevention wire that runs around the tag fastener hole that prevents theft and notifies the user if the tag is removed from the designated animal. The tag is fastened in order to achieve maximum GNSS antennae transmission. The ear tag is powered by an internal battery and is trickled charged via a solar panel. The wireless network backhaul will receive data about the tags and the data will be used in a front-end web application, Android application, and iOS application. The user can also send data back to the tag. These short commands will include features such as reboot, blink light-emitting diodes (LED), change of mode, and request historical data.

DETAILED DESCRIPTION OF THE INVENTION

All illustrations of the drawings are for the purpose of describing selected versions of the present invention and are not intended to limit the scope of the present invention.

In reference to FIG. 1 through 8, an electronic ear tag that allows an individual to track an animal or object is shown. Furthermore, the present invention is an ultra-low power and lightweight tag that runs only when needed. The present invention comprises a substrate, a microcontroller, a rechargeable battery, a wireless communication module, a GNSS module, and a solar panel.

The substrate is a circuit board used to support the electronic components of the present invention. The rechargeable battery is preferably a lithium polymer battery that is shaped to maximize the battery yield and to distribute the weight of the present invention. The wireless communication module is preferably a wireless network radio module that allows the present invention to communicate with a central network. The GNSS module allows the present invention to communicate with a GNSS satellite in order to determine the precise geographical location of the present invention. The solar panel converts solar energy into electrical energy. The converted energy is used to charge the rechargeable battery. The general configuration of the forementioned components allow an individual to track a herd animal through the use of the present invention.

In reference to FIG. 2 through 5, the substrate is shown. The substrate further comprises a flat top portion, a bottom flat portion, and an ear-attachment feature. The ear-attachment feature allows the present invention to be attached to the of a herd animal. Within other embodiment of the present invention, the ear-attachment feature may take different form, size, and shape. The top flat portion and the bottom flat portion each further comprise a first face and a second face. The ear-attachment feature is integrated into the top flat portion. Furthermore, the ear-attachment feature may be an aperture which traverses through the substrate. The rechargeable battery is mounted into the first face of the bottom flat portion. The forementioned arrangement positions the rechargeable battery in order to efficiently power the electronic components of the present invention to weigh the present invention into hanging plumb from the ear of a herd animal.

Figure 1:
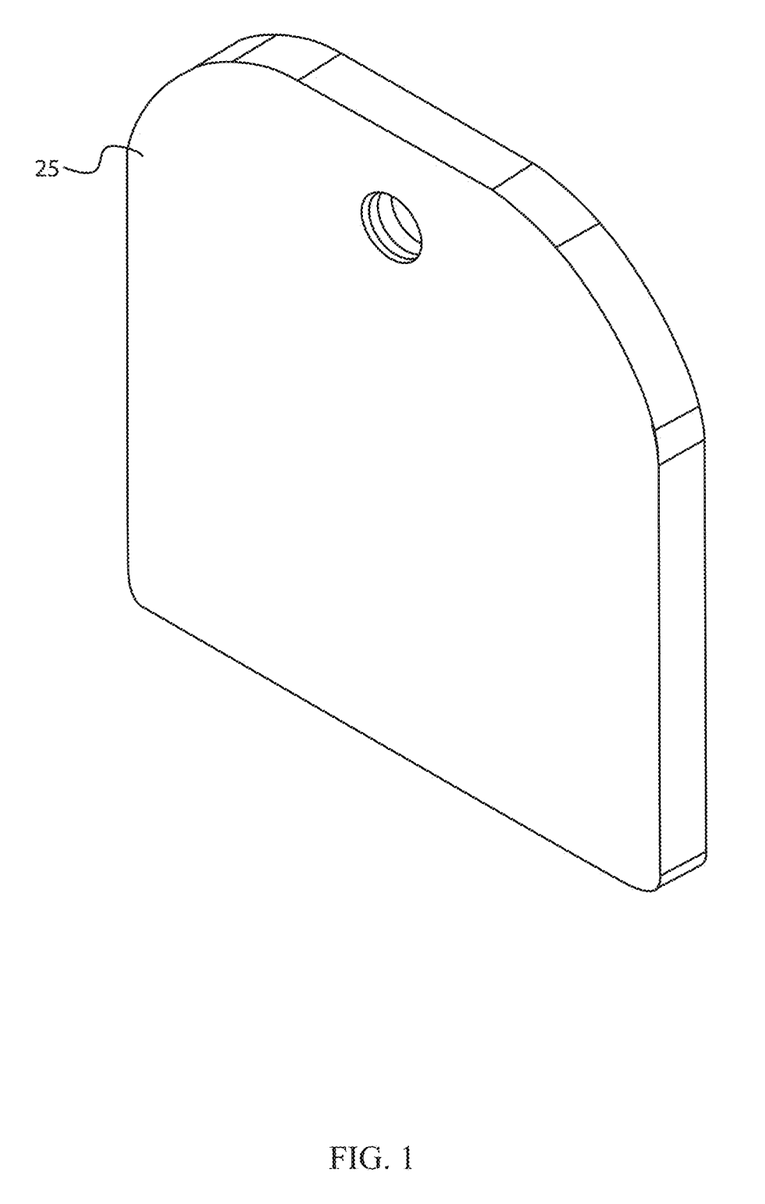
FIG. 1 is a front perspective view of the present invention.
Figure 2:
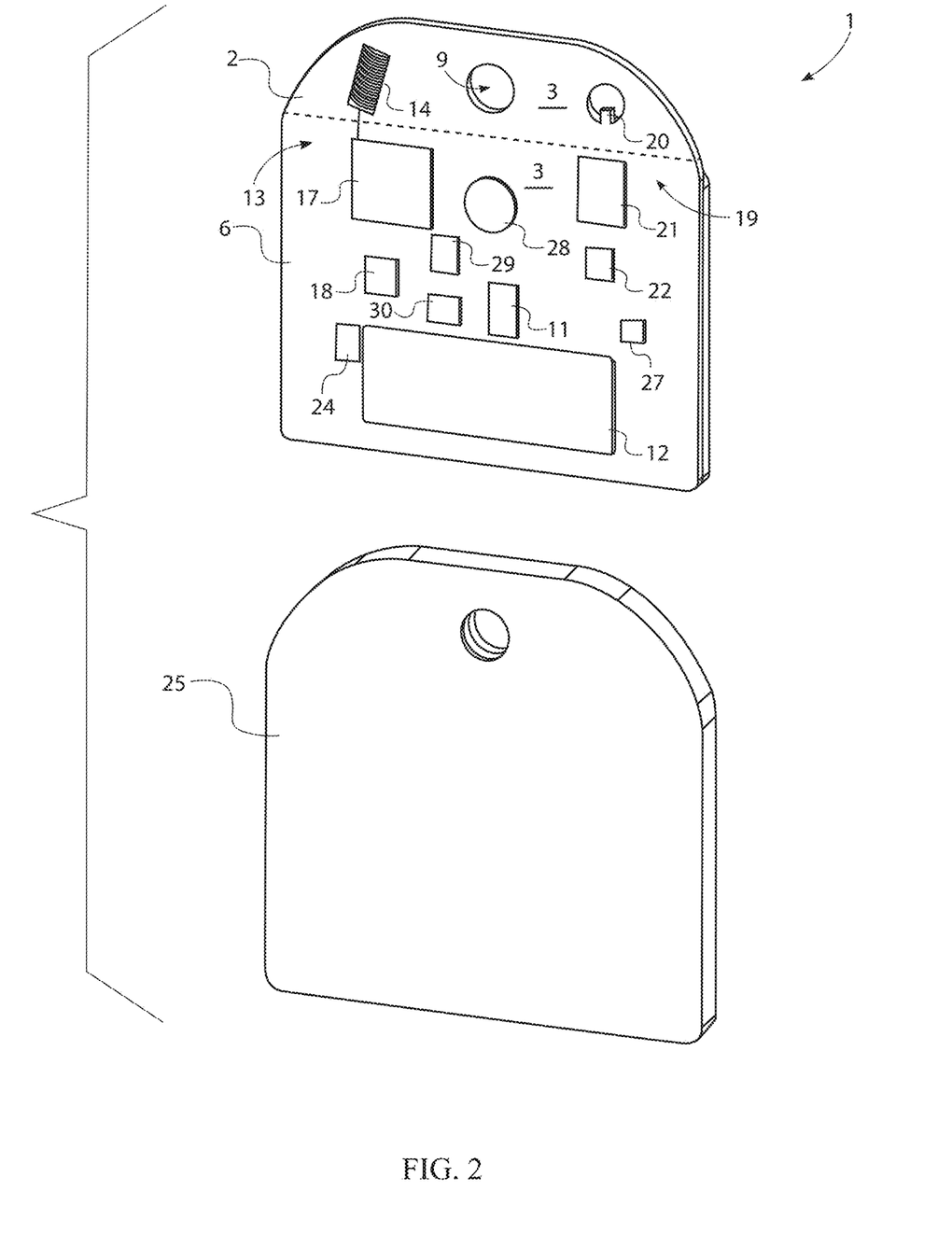
FIG. 2 is an exploded front perspective view of the present invention.
Figure 3:
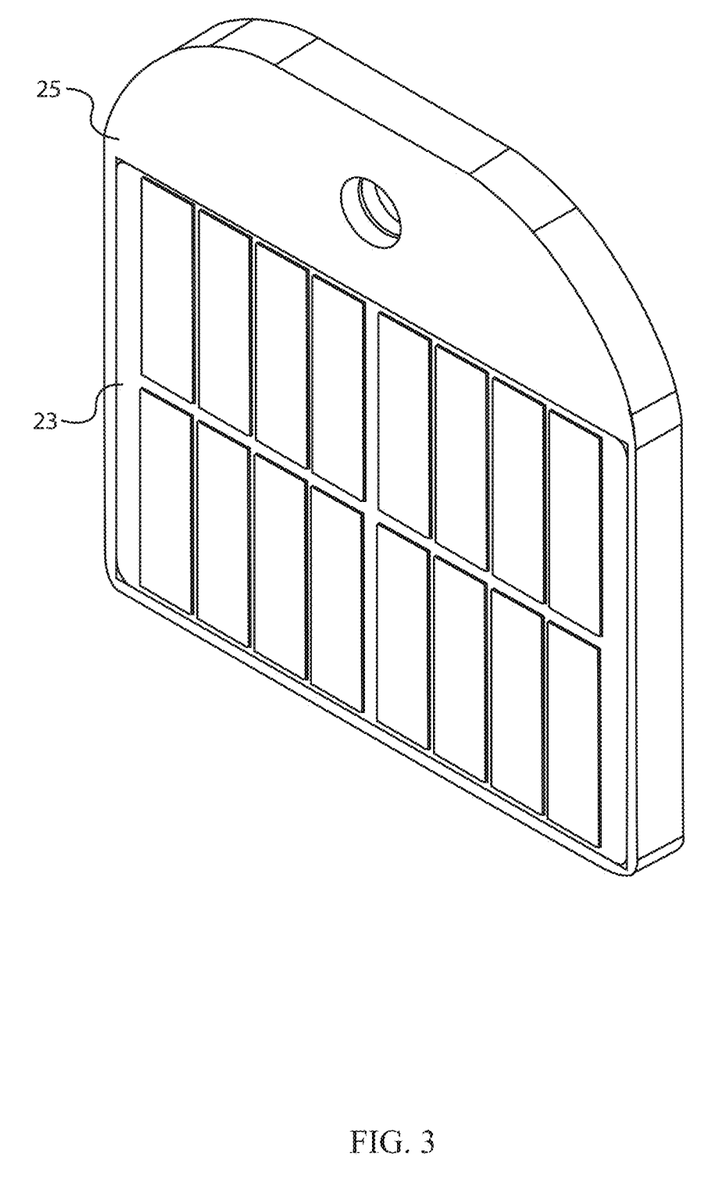
FIG. 3 is a rear perspective view of the present invention.
Figure 4:
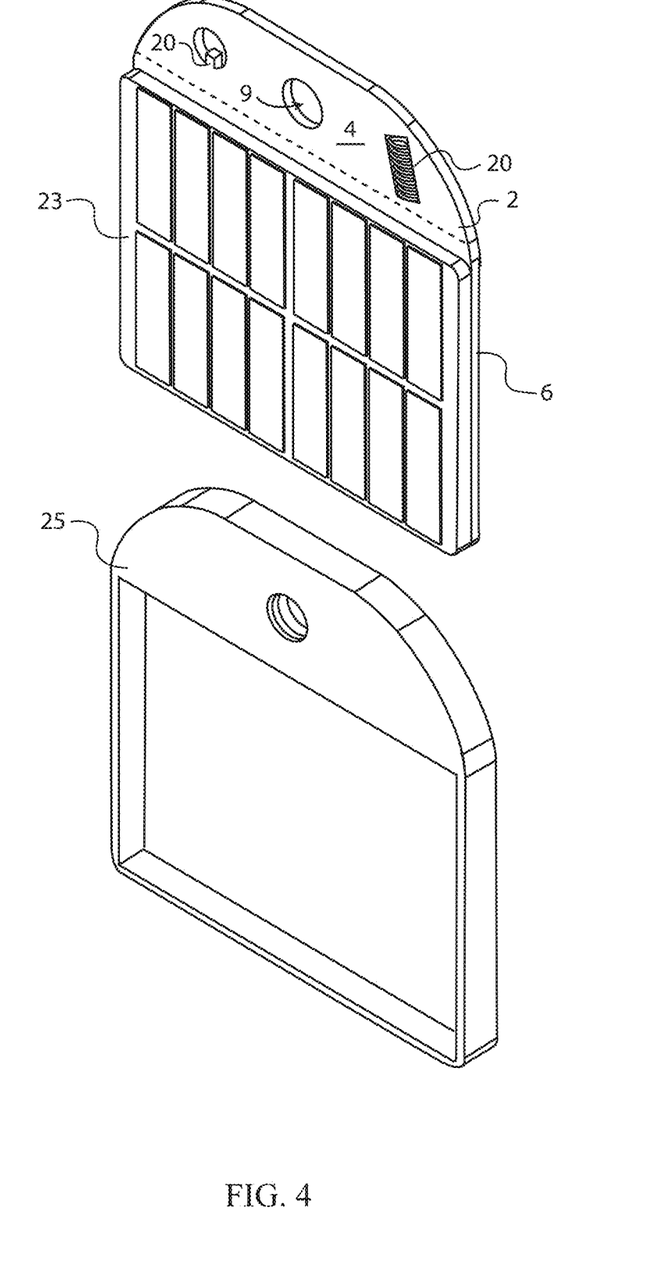
FIG. 4 is an exploded rear perspective view of the present invention.

The microcontroller is mounted onto the first face of the bottom flat portion. The wireless communication module and the GNSS module are integrated into the substrate. As can be seen in FIGS. 3 and 4, the solar panel is mounted onto the second face of the bottom flat portion. Furthermore, the solar panel maximizes the surface area available for energy absorption by allowing the solar panel to span across the substrate without physically intersecting any other components of the present invention.

Figure 7:
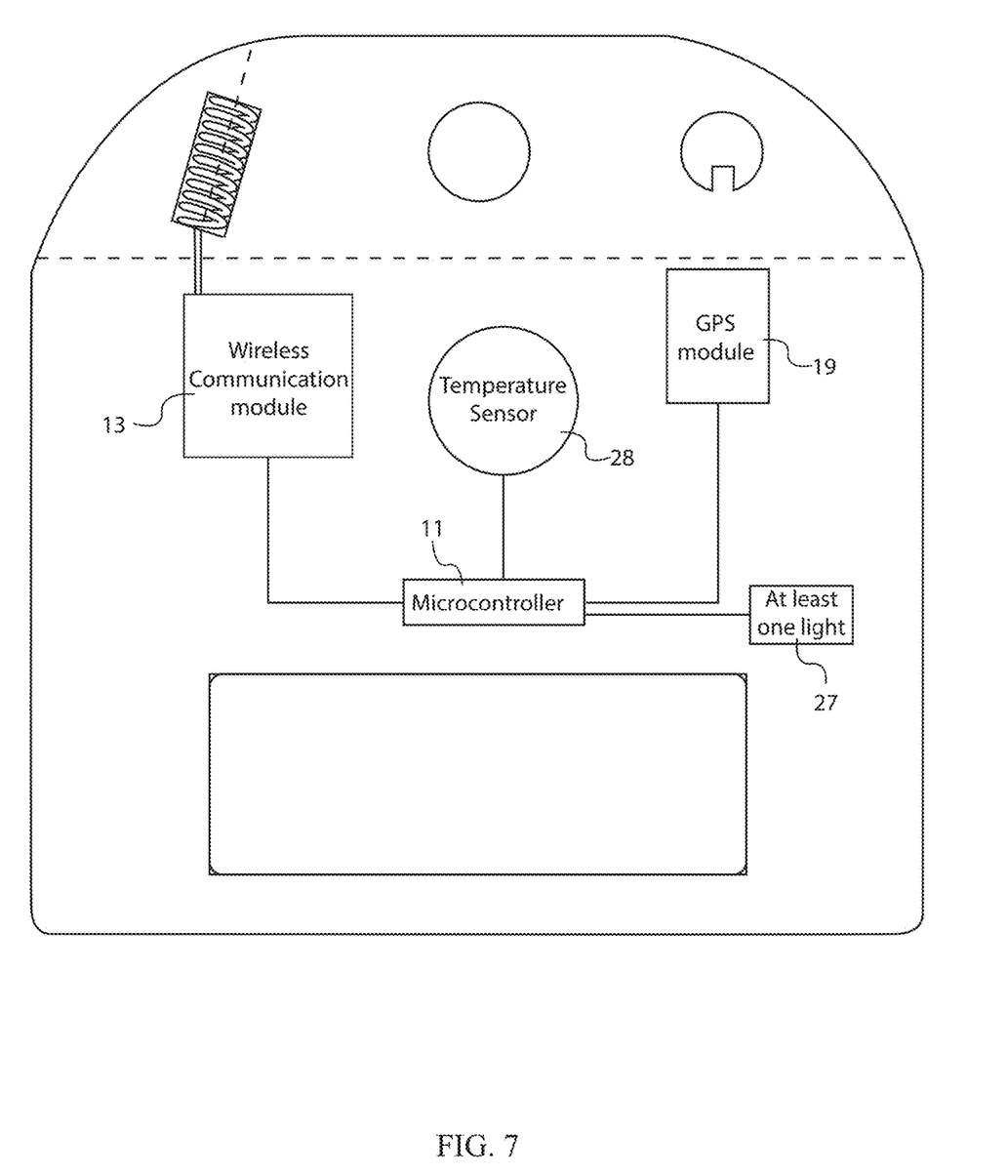
FIG. 7 is a schematic view illustrating the electrical connection of the present invention.

In reference to FIG. 7, the solar panel is operatively coupled to the rechargeable battery in order for the solar panel to recharge the rechargeable battery. Furthermore, the forementioned arrangement of the solar panel and rechargeable battery allows the converted electrical energy from the solar panel to be transferred to the rechargeable battery. The rechargeable battery is electrically connected to the micro controller, the wireless communication module, and the GNSS module. The microcontroller is electronically connected to the wireless communication module and the GNSS module. Thus, the microcontroller is used to manage and control the wireless communication module and the GNSS module.

Figure 6:
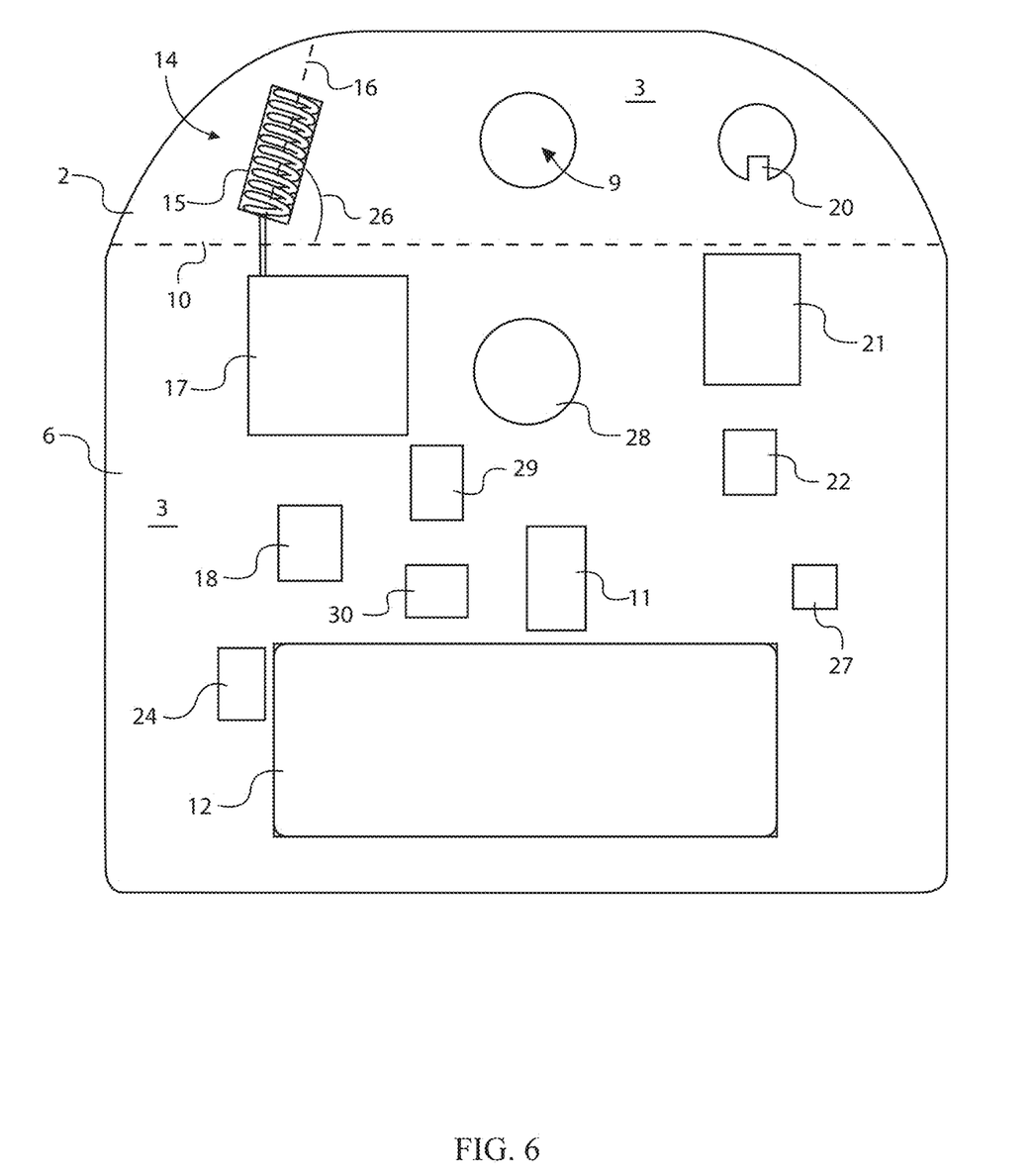
FIG. 6 is a front view of the present invention without the casing.

In reference to FIGS. 6 and 7, the present invention may further comprise a solar charge controller in order to safely charge the rechargeable battery. The solar charge controller is used to modify the current and/or voltage of the converted electrical energy in order to safely charge the rechargeable battery. The solar charge controller is mounted to the first face of the bottom flat portion. The forementioned arrangement positions the solar charge controller near the solar panel and the rechargeable battery in order to easily transfer the converted electrical energy from the solar panel to the rechargeable battery. Furthermore, the solar panel is electrically connected to the rechargeable battery through the solar charge controller. Thus, the solar panel can safely charge the rechargeable battery through the solar charge controller.

In reference to FIG. 1 through 4, the present invention further comprises a casing in order to protect and conceal the electronical components of the present invention. The substrate, the microcontroller, the rechargeable battery, the wireless communication module, and the GNSS module are protected and concealed by the casing. The solar panel is positioned external to the casing in order for the solar panel to effectively receive solar energy. Furthermore, the casing is hermetically connected around the solar panel in order to be fully secured to the substrate. In addition, the casing is preferably made of thermoplastic elastomer material in order to form a gasket around the solar panel. In the preferred embodiment, the substrate casing will be made of polycarbonate material. The polycarbonate material is infused with an ultra-violet resistance material over the casing. It is important to note that there is no seal around the edges of the solar panel due to the polycarbonate housing unit, but the solar cell area will be non-UV resistant material that is infused into the hardware of the housing unit. In addition, every exterior portion of the present invention will be covered/made with UV resistant material besides the solar cell area.

In reference to FIG. 6, the GNSS module may comprise a GNSS antenna and a GNSS receiver. The GNSS antenna is used to amplify the signal sent by a GNSS satellite. The GNSS antenna is integrated into the top flat portion in order to be oriented towards the GNSS satellite. The GNSS receiver is mounted onto the first face of the bottom portion in order to be efficiently powered by the rechargeable battery. Moreover, the GNSS module may further comprise a GNSS power switch. The GNSS power switch can be used to open or close the electrical connection between the GNSS module and the rechargeable battery. The GNSS power switch is mounted onto the first face of the bottom flat portion. The forementioned arrangement of the GNSS power switch allow for close positioning to the GNSS receiver and the rechargeable battery. Furthermore, the rechargeable battery is electrically connected to the GNSS receiver through the GNSS power switch. Thus, the electrical connection between the GNSS receiver and the rechargeable battery can be opened or closed through the GNSS power switch. In addition, the GNSS power switch opens the electrical connection between the GNSS receiver and the rechargeable battery in order to conserve energy when the present invention is not in use or in idle mode.

Figure 8:
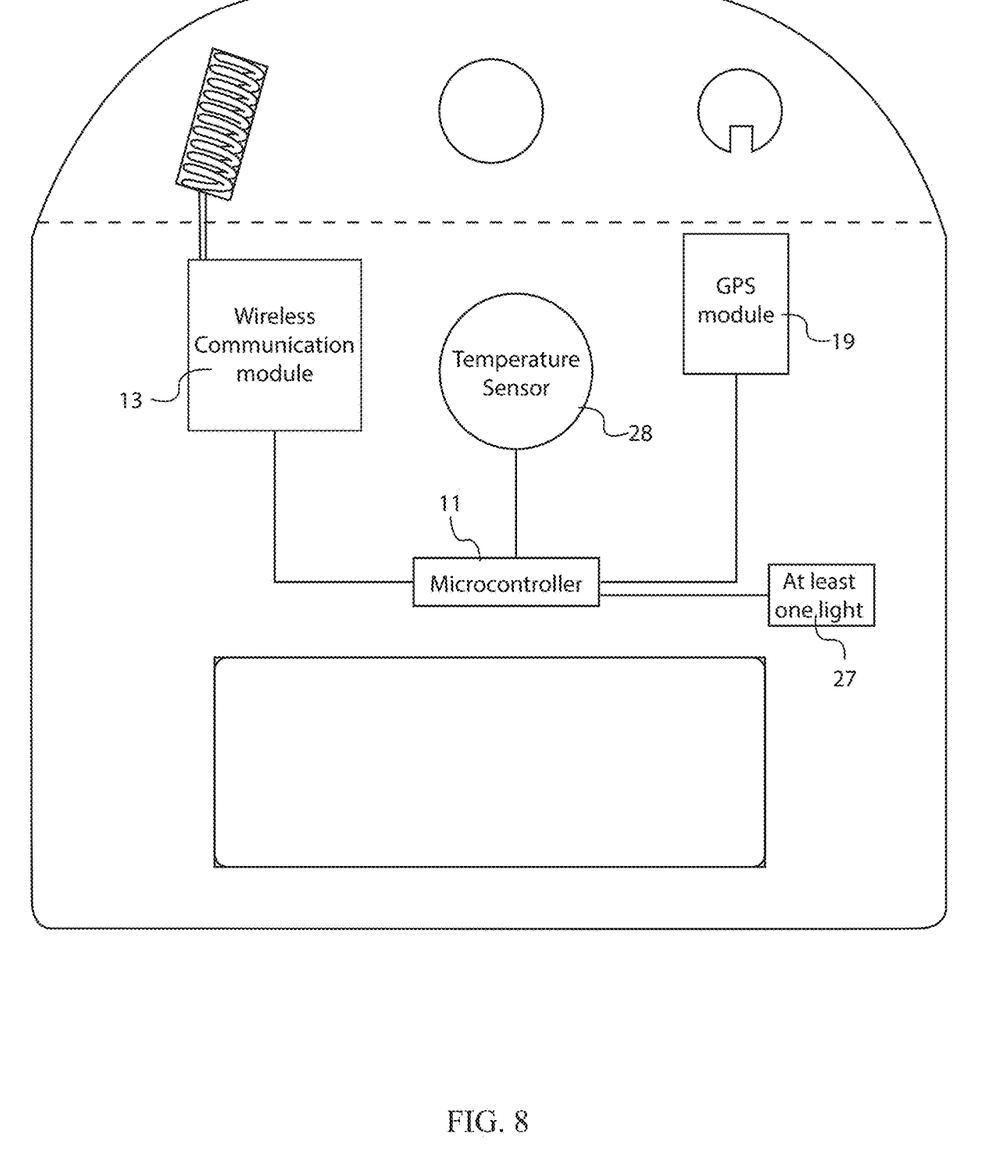
FIG. 8 is a schematic view illustrating the electrical connection of the present invention.

In reference to FIG. 6 through 8, the wireless communication module may further comprise a communication antenna and a communication transmitter. The communication antenna is used to amplify the signal sent by the wireless communication module. The communication transmitter is used to send a signal to a central network such as, but not limited to, a wireless network. The communication antenna is integrated into the top flat portion in order to optimize the signal sent by the communication transmitter. The communication transmitter is mounted onto the first face of the bottom flat portion. The forementioned arrangement positions the communication transmitter to be efficiently powered by the rechargeable battery. Furthermore, the communication transmitter is positioned adjacent to the communication antenna in order to minimize the power loss between the communication antenna and the communication transmitter. In addition, the wireless communication module may further comprise a communication power switch.

The communication power switch can be used to open or close the electrical connection between the wireless communication module and the rechargeable battery. The communication power switch is mounted onto the first face of the bottom flat portion which allow the communication power switch to be positioned closely to the communication transmitter and the rechargeable battery. In addition, the rechargeable battery is electrically connected to the communication transmitter through the communication power switch. Thus, the electrical connection between the communication transmitter and the rechargeable battery can be opened or closed through the communication power switch. Moreover, the communication power switch may open the electrical connection between the wireless communication module and the rechargeable battery when the present invention is not in use in order to conserve energy. The communication antenna further comprises an elongated antenna body which is oriented in a specific manner in order to establish optimal connection between the wireless communication module and a central network. The central axis of the elongated antenna body is oriented at an acute angle with a sagittal plane of the substrate in order to establish the optimal communication.

In reference to FIG. 6 through 8, the present invention may further comprise one or more light in order for an individual to track a herd animal in dark environments. The light(s) is preferably an LED light. The light(s) is mounted onto the first face of the bottom flat portion. The positioning of the light(s) near the rechargeable battery in order to establish a lower-power electrical connection. Furthermore, the light(s) is electrically connected to the rechargeable battery and is electronically connected to the microcontroller. Thus, the rechargeable battery is able to power the light(s) and the microcontroller is able to manage and control the light(s).

In reference to FIGS. 6 and 8, the present invention may further comprise a temperature sensor. The temperature sensor is utilized to measure and observe the temperature of the electrical components of the present invention. The temperature sensor is mounted onto the first face of the bottom flat portion. The positioning placement of the temperature sensor near the rechargeable battery allow for the establishment of a low-powered electrical connection. Furthermore, the temperature sensor is electrically connected to the rechargeable battery. Thus, the rechargeable battery is able to power the temperature sensor by means of the microcontroller and the microcontroller is able to receive temperature measurements from the temperature sensor.

In reference to FIGS. 6 and 7, the present invention may further comprise an initialization circuit and an optical power switch. The initialization circuit and optical power switch are utilized to initialize and turn on the present invention only after the exposure of solar energy. The initialization circuit and the optical power switch are mounted into the first face of the bottom flat portion. The positioning placement of the initialization circuit and the optical power switch near the rechargeable battery allow for the establishment of a low-powered electrical connection. Furthermore, the initialization circuit is electrically connected to the rechargeable battery by means of the optical power switch. Thus, the optical power switch can open or close the electrical connection between the initialization circuit and the rechargeable battery. Furthermore, the electrical connection between the initialization circuit and the rechargeable battery is closed by the optical power switch when the optical power switch is exposed to solar energy. The forementioned components interaction with one another allow for the power of the rechargeable battery to be conserved until the present invention is unpackaged and ready to use.

Figure 5:
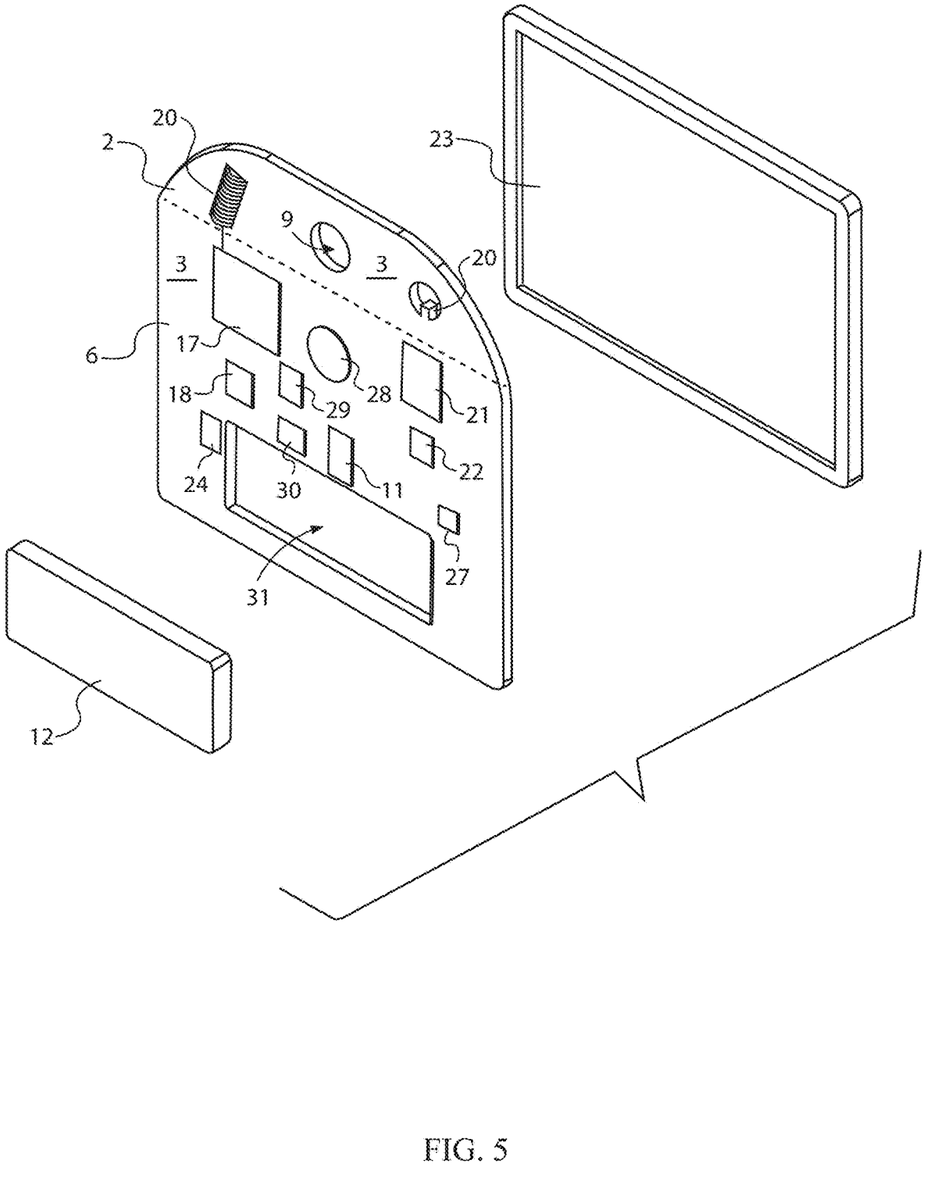
FIG. 5 is an exploded front perspective view of the present invention without the casing.

In reference to FIG. 5, the substrate may further comprise a battery cutout. The battery cutout support and contain the rechargeable battery. The battery cutout traverses from the first face of the bottom flat portion to the second face of the bottom flat portion. Furthermore, the rechargeable battery is positioned into the battery cutout and the rechargeable battery is connected onto the solar panel. Since the substrate is structurally a thin board, the battery cutout is required in order to laterally support the rechargeable battery. In addition, the rechargeable battery is fully secured to the substrate by being fixed to the solar panel.

Note that the present invention can be applied by the covering of the subscriber identity module (SIM) chip. The covering of the SIM chip allows for embedding the SIM chip onto a board instead of a SIM card/cartridge as initially explained. In addition, the present invention is not limited to embedded sim chips onto a board. The sim chip can be used as an insertion and plugged into a cartridge and cover/screw over the insertion area for non-element proofing. The present invention is utilized as a sim or direct from device to satellite. All of the gateway methods are to be understood that the gateway methods can be used as well. Although the present invention is mostly utilized as a sim or direct to satellite from device method of communication that the user can have no limitations on range.

In addition, the solar panel/cell system of the present invention may include updated and most recent technology such as the low-light solar panel/cell technology. Furthermore, the solar panel/cell system of the present invention may be solar-spray technology. Solar spray technology is a unique technology that allow for spray-on solar cells which are made from nanoparticles that absorb light and conduct electricity. The nanoparticles come from two common elements: phosphorus and zinc. The elements are combined and processed into a liquid which can be sprayed onto solar cells. The particles can also be dissolved to form an ink to be used in spray-coating or roll-to-roll printing. The ink is processed into thin films that are responsive to light.

In the preferred embodiment, the present invention is explained with a rechargeable battery or lithium battery. Note that any energy storage can be utilized in replacement such as a super capacity. In addition, updated technology such as quantum glass batteries, glass batteries, motion & vibration charging chips, climate & heat chips, as well as other energy storage technology.

Figure 9:
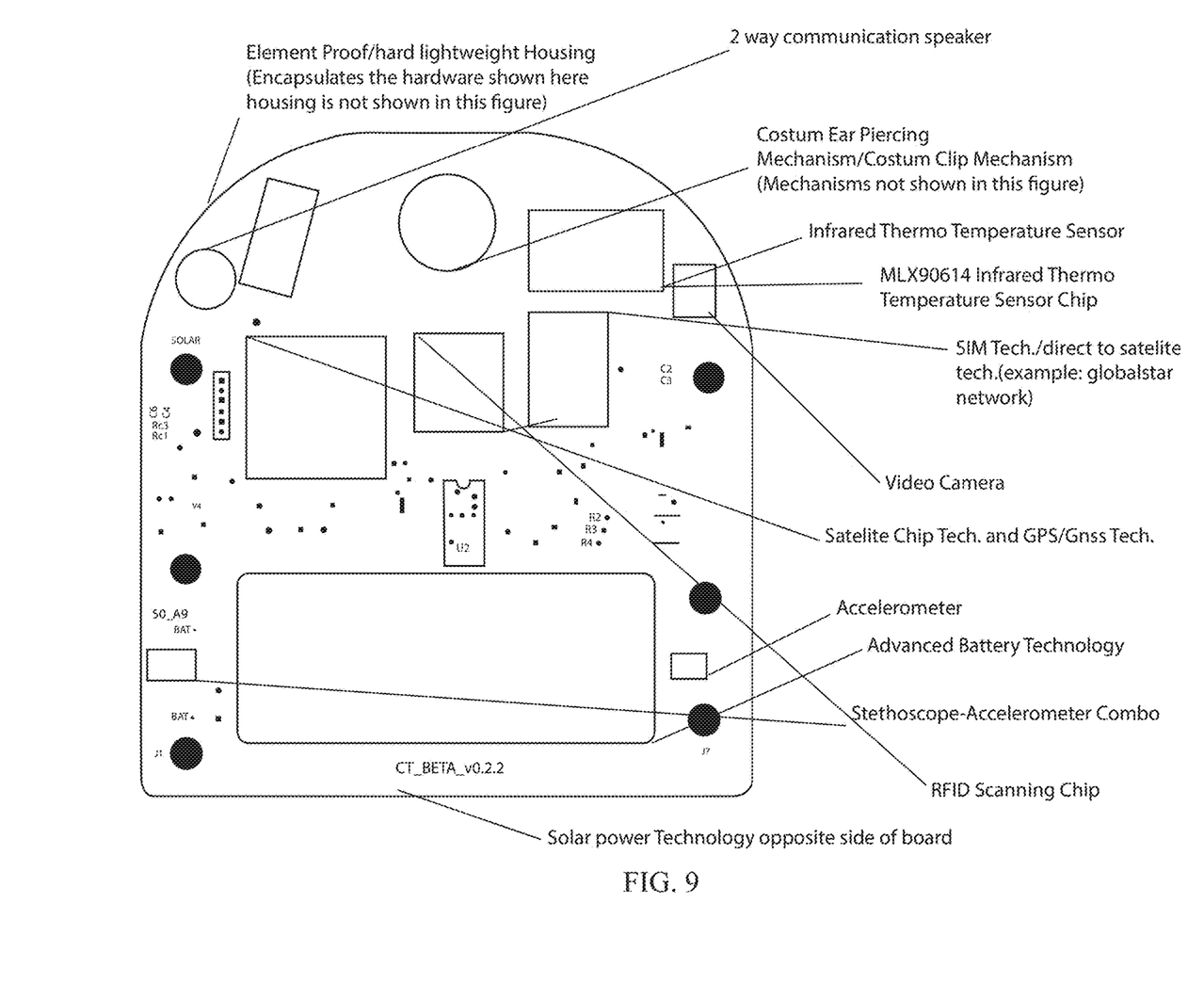
FIG. 9 is a schematic view of one embodiment of the present invention.
Figure 10:
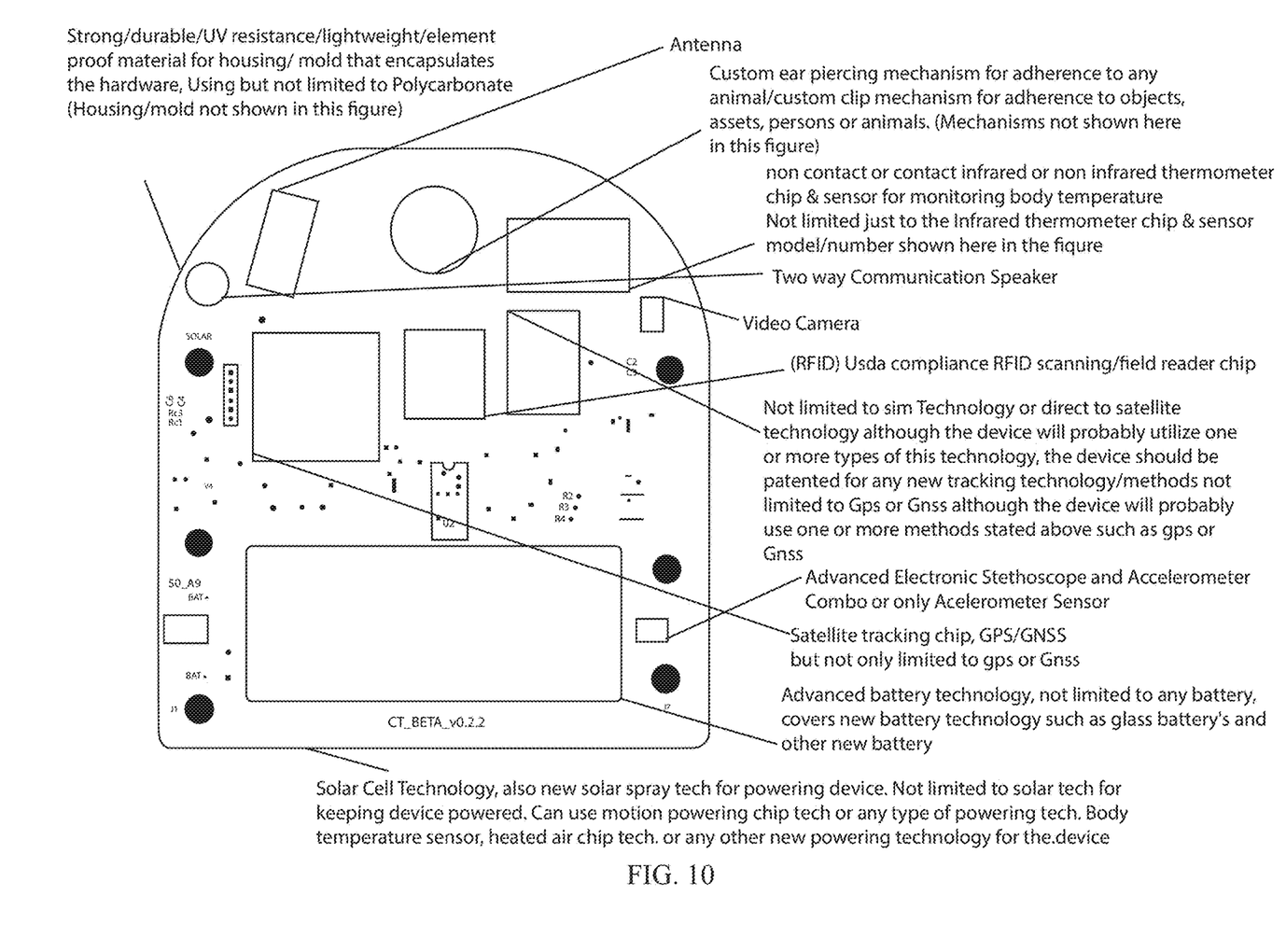
FIG. 10 is a schematic view of one embodiment of the present invention.

In the preferred embodiment, the present invention further comprises a camera as can be seen in FIGS. 9 and/or 10. The camera is used to visually provide the user an optical display or of the likes to allow the user to visually see the surrounding and area of the tracked animal/object/device.

In the preferred embodiment, the present invention further comprises a body temperature monitoring non-contact infrared thermometer sensor as can be seen in FIGS. 9 and/or 10. The body temperature monitoring thermometer is utilized to keep track and measure the body temperature of the animal or object in which the present invention is attached to.

In the preferred embodiment, the present invention further comprises an accelerometer as can be seen in FIGS. 9 and/or 10. The accelerometer is a device that measures the acceleration of the animal or object in which the present invention is attached to.

In the preferred embodiment, the present invention further comprises a stethoscope as can be seen in FIGS. 9 and/or 10. The stethoscope is utilized as a mechanism/device to track the animal's heart and/or breathing in which the present invention is attached to. In addition, the present invention is able to utilize different stethoscope such as advanced electronic stethoscope.

In the preferred embodiment, the present invention further comprises a radio-frequency identification (RFID) scanning chip as can be seen in FIGS. 9 and/or 10. The RFID scanning chip is preferably a product of the United States Department of Agriculture (USDA). The RFID scanning chip utilize a unique identification number to assist the user to identify the animal/object in which the present invention is attached to.

In the preferred embodiment, the present invention further comprises a two-way communication speaker system as can be seen in FIGS. 9 and/or 10 The two-way communication speaker system allow audio to be sent from the user to the animal/object or animal/object to the user. The two-way communication speaker system allows for communication of the user and the animal/object.

In the preferred embodiment, the present invention is utilized as a monitoring system for animals. The present invention is able to monitor a wide range of features and characteristics. Features include, but are not limited to, positioning, rewinding past movements, geofencing features, animal health, breeding, birthing, temperature of body via thermometer, menstrual cycle, heartbeat and lung monitoring with stethoscope, precession movements, and food/water intake with accelerometer, illness detection, and health records. The present invention uploads the features, characteristics, and information to a custom interface software application. The initialization method for turning the device on will be a scanner code and chip-like codes that the user can scan using their smart device such as a smartphone. Moreover, the present invention can also be utilized for grazing data to assist and enhance the planting of crops. Furthermore, the present invention is not limited to scan initializing chip for turning the device on but can also use other methods like a pull-out tab for turning on.

In the preferred embodiment, the present invention is said to attach to ears of animals. It is clearly understood that the present invention can also adhere to the tail of an animal. In addition, the present invention is able to attach to an animal by means of attaching to a collar. Other methods attachment methods to an animal or object are possible and the said methods does not limit the spirit and scope of the present invention.

In the preferred embodiment, the present invention is allow for connectivity using a gateway device and communicating directly to satellite from a base station or a gateway. The present invention connectivity is able to utilize direct to satellite from base stations and gateways. The forementioned connectivity allow for people to utilize the present invention in areas with no cellular service.

In the preferred embodiment, the present invention utilizes a wide range of technological communication systems and methods for upgrading updating, and servicing of the hardware and the software. Communication systems and methods includes, but are not limited to, firmware over-the-air (FOTA), over the air service provisioning (OTASP), over the air provisioning (OTAP), over the air parameter administration (OTAPA), wireless access point (WAP), multimedia messaging service (MMS), over the air (OTA) via short message services, open mobile alliance (OMA), artificial intelligence (AI), and device/software utilizing AI. The present invention may use other forms of communication systems and methods that has not been specifically listed as a form of data transfer/communication system.

Note that explanation of the present invention to be utilized as tracking device for an animal or object is not intended to limit the spirit and scope of the present invention. Thus, the present invention can be utilized as a GNSS device tracker for any desired object, equipment, animal, person, etc. In addition, the present invention has been described and explained with the usage of a wireless network but is not intended to be limited to only wireless network as the present invention can be used by any type of network or system, including LPWAN, wireless, satellite, WiFi, and others, and. For example, the connectivity system that can be used can be wireless narrowband-Internet of Things (NB-IoT) compatible and Long-Term Evolutions for Machines (LTE-M) compatible. In addition, satellite connectivity may include technology such as Globalstar network. Furthermore, the present invention is not limited to GNSS, as the ability to utilize global positioning system (GPS) is also available. Furthermore, the present invention is not limited to only running when needed. The present invention is able to send a location fix in real-time and can also slow down location fixes when the device is low on power due to less availability of sunlight as the accelerometer runs nearly all the time.

Although the invention has been explained in relation to its preferred embodiment, it is to be understood that many other possible modifications and variations can be made without departing from the spirit and scope of the invention.

What is claimed is:

1. A solar-powered GPS Sim card device for tracking and monitoring animals and assets, comprising:
    an electronic ear tag;
    a subscriber identity module (SIM) chip;
    a solar panel/cell system;
    an energy storage mechanism;
    a camera;
    a non-contact infrared thermometer sensor for body temperature monitoring:
    an accelerometer;
    a stethoscope;
    a radio-frequency identification (RFID) scanning chip;
    a two-way communication speaker system;
    an animal-movement monitoring system; and
    the SIM chip, the solar panel/cell system, the energy storage mechanism, the camera, the body temperature monitoring non-contact infrared thermometer sensor, the accelerometer, the stethoscope, the RFID scanning chip, the two-way communication speaker system, and the animal-movement monitoring system being operatively integrated into the electronic ear tag.

* * * * *